United States Patent [19]

Madden et al.

[11] Patent Number: 5,521,723
[45] Date of Patent: May 28, 1996

[54] SYSTEM FOR PRODUCING A COLOR HARDCOPY HAVING THE COLOR AND THE TONE REPRODUCTION CHARACTERISTICS OF A PHOTOGRAPH

[75] Inventors: Thomas E. Madden, East Rochester; Anthony J. Leone, Pittsford, both of N.Y.

[73] Assignee: Eastman Kodak Company, Rochester, N.Y.

[21] Appl. No.: 260,936

[22] Filed: Jun. 16, 1994

[51] Int. Cl.$^6$ .............................. H04N 1/56; H04N 1/60
[52] U.S. Cl. .................... 358/501; 358/518; 358/521; 358/523; 358/527
[58] Field of Search .................... 358/527, 504, 358/518, 519, 521, 520, 523, 501

[56] References Cited

U.S. PATENT DOCUMENTS

| | | | |
|---|---|---|---|
| 4,346,402 | 8/1982 | Pugsley | 358/523 |
| 4,656,524 | 4/1987 | Norris et al. | 358/527 |
| 4,707,119 | 11/1987 | Terashita | 358/527 |
| 4,769,696 | 9/1988 | Utsuda et al. | 358/527 |
| 4,772,941 | 9/1988 | Noble | 358/527 |
| 4,825,296 | 4/1989 | Wagensonner et al. | 358/527 |
| 4,839,722 | 6/1989 | Barry et al. | 358/523 |
| 4,941,039 | 7/1990 | D'Errico | 358/523 |
| 4,956,703 | 9/1990 | Uzuda et al. | 358/527 |
| 4,965,662 | 10/1990 | Shiota | 358/527 |
| 4,992,861 | 2/1991 | D'Errico | 358/518 |
| 5,012,333 | 4/1991 | Lee et al. | 358/520 |
| 5,018,085 | 5/1991 | Smith . | |
| 5,027,196 | 6/1991 | Ono et al. | 358/527 |
| 5,053,866 | 10/1991 | Johnson | 358/504 |
| 5,057,913 | 10/1991 | Nagata et al. | 358/527 |
| 5,060,061 | 10/1991 | Shishido et al. . | |
| 5,073,818 | 12/1991 | Iida . | |
| 5,081,529 | 1/1992 | Collette . | |
| 5,121,198 | 6/1992 | Maronian . | |
| 5,208,911 | 5/1993 | Newman et al. . | |
| 5,231,506 | 7/1993 | Manico et al. | 358/501 |
| 5,276,511 | 1/1994 | Takemoto | 358/527 |
| 5,305,119 | 4/1994 | Rolleston et al. | 358/523 |
| 5,329,383 | 7/1994 | Colette | 358/527 |

*Primary Examiner*—Scott A. Rogers
*Attorney, Agent, or Firm*—Thomas H. Close

[57] ABSTRACT

A color image reproduction system of the type having a color monitor, an image processing computer, and a color printer is capable of making a color print that appears as if the original image was captured by a photographic process. The effect is achieved by providing a transform embodied in a three dimensional look-up table formed by composing: a) a transform for transforming the color digital image to original scene exposures; b) a transform for transforming the video scene exposures to photographic scene exposures; c) a transform for transforming photographic scene exposures to channel-independent densities; d) a transform for transforming channel-independent densities to reproduced densities; and e) a transform for transforming the reproduced densities to control signals for driving the color hard copy output means.

7 Claims, 5 Drawing Sheets

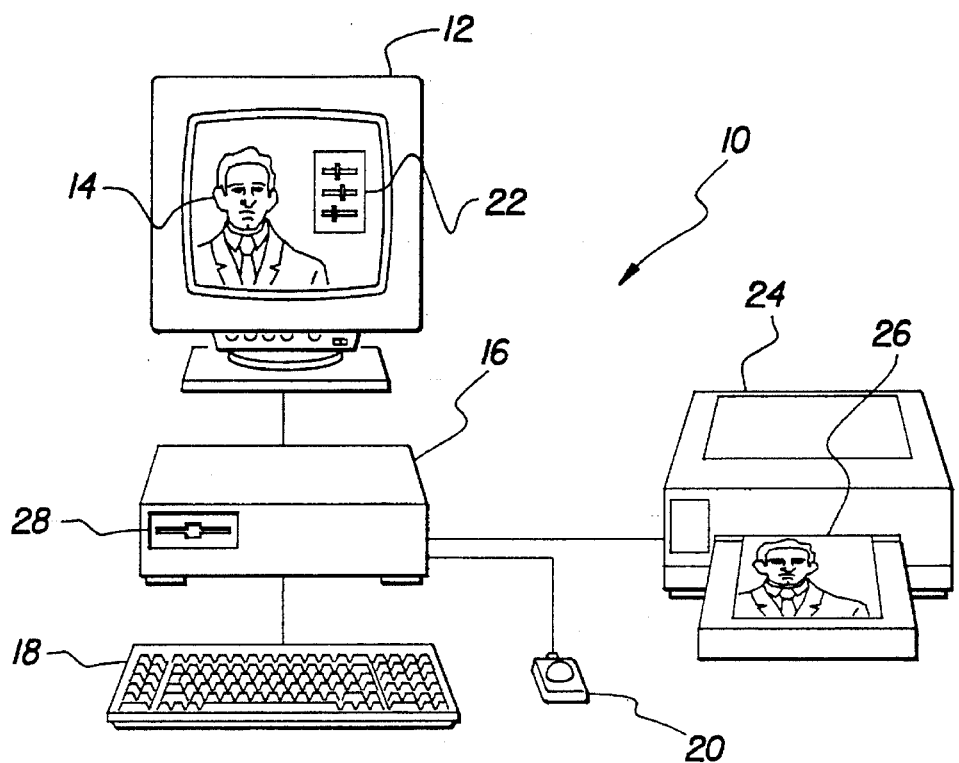
FIG.1
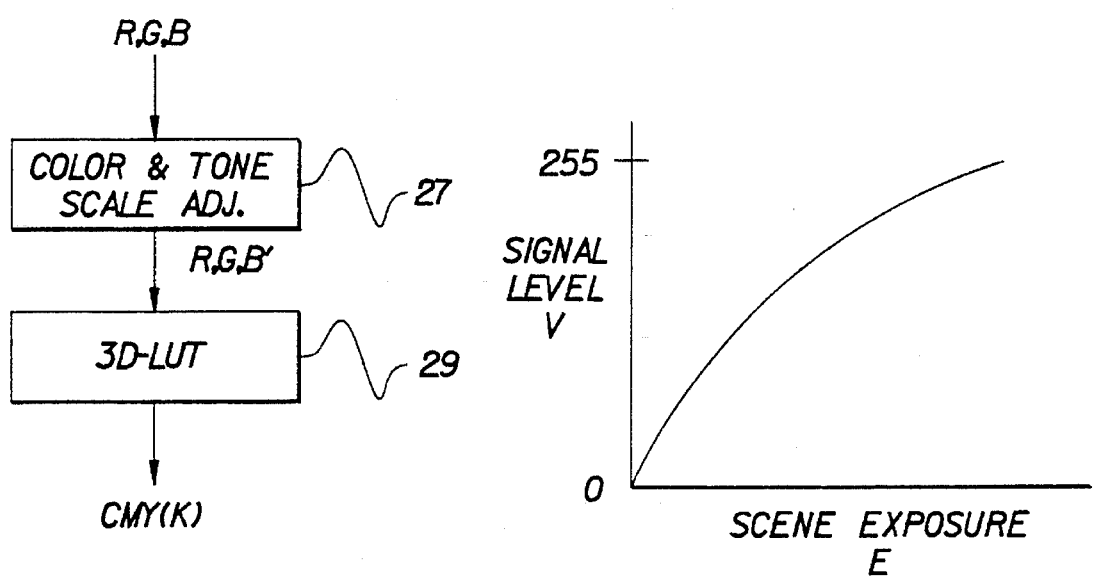
FIG.2
FIG.4

SYSTEM FOR PRODUCING A COLOR HARDCOPY HAVING THE COLOR AND THE TONE REPRODUCTION CHARACTERISTICS OF A PHOTOGRAPH

FIELD OF THE INVENTION

This invention relates to a method for processing a color image and apparatus therefor, particularly to a method of color image processing for transforming image data that looks pleasing when displayed on a calibrated color monitor to image data that has the characteristics of a photograph when printed on a color printer.

BACKGROUND OF THE INVENTION

Many modern color reproduction systems include a color monitor, an image processing computer, and a color printer such as an ink jet, thermal or digital photographic printer. It is a common objective of such systems to make the appearance of the print match as closely as possible the appearance of the monitor. See for example U.S. Pat. No. 5,081,529 issued Jan. 14, 1992 by Collette wherein the appearance of a hard copy output is made to match the appearance of a color monitor by first producing a desired image on the monitor and then making a sample proof. The proof will ordinarily not match the monitor. The monitor is then adjusted until the monitor image looks the same as the proof. The inverse of these adjustments are then made to the digital image in the processor so that subsequent prints produced by the printer will match the monitor which is returned to its original calibration. In some cases, it is not desirable to make the appearance of the output of the printer match the appearance of the monitor, rather it is preferred to make the output of the printer appear as if the original image was captured by photography, either as a color print or a color slide.

SUMMARY OF THE INVENTION

It is the object of the present invention to provide a color image reproduction system of the type having a color monitor, an image processing computer, and a color printer that is capable of making a color print that appears as if the original image was captured by a photographic process.

The object of the invention is achieved according to the present invention by providing a transform for transforming color monitor image data to have the color balance and tone reproduction characteristics for producing an image having the appearance of a color photographic image. According to a preferred embodiment of the invention, the transform is embodied in a three dimensional look-up table formed by composing: a) a transform for transforming the color digital image to original scene exposures; b) a transform for transforming the video scene exposures to photographic scene exposures; c) a transform for transforming photographic scene exposures to channel-independent densities; d) a transform for transforming channel-independent densities to reproduced densities; and e) a transform for transforming the reproduced densities to control signals for driving the color hard copy output means.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1. depicts hardware components of a color reproduction system useful in practicing the present invention;

FIG. 2. is a flow chart illustrating the generalized process for transforming a digital color image according to the present invention;

FIG. 4 is a graph showing a video camera optoelectronic transfer characteristic;

DETAILED DESCRIPTION OF THE INVENTION

Figure 3:
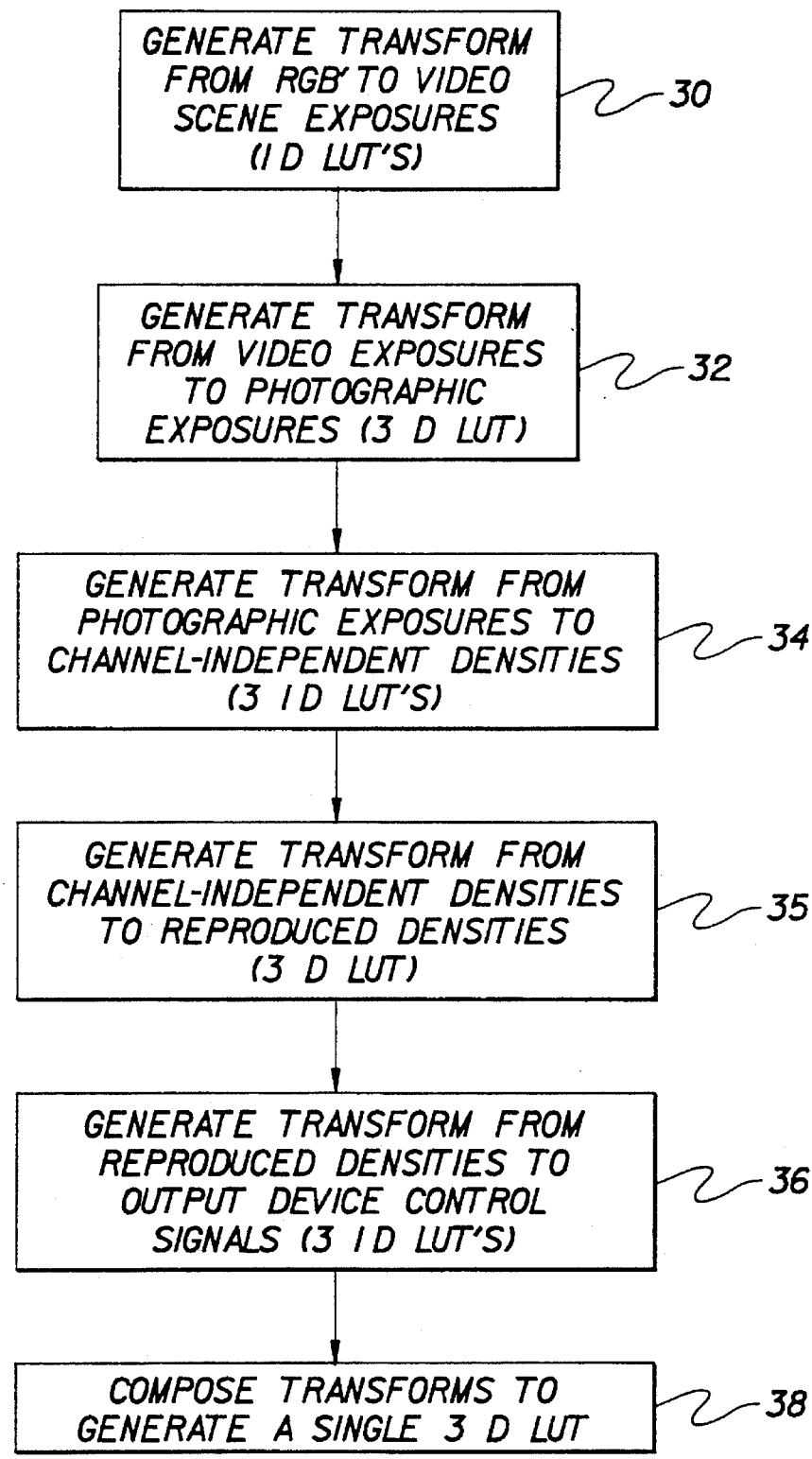
FIG. 3 is a flow chart of the process for generating the 3-D LUT shown in FIG. 2.

The present invention provides a method and apparatus for making a hard copy output from a color image reproduction system appear as if the original image had been captured by photography. FIG. 1 shows one hardware system configuration useful for practicing the present invention. The color image reproduction system generally designated 10, includes a color image display 12 such as a conventional computer color monitor which displays a color digital image 14. Color digital image 14 may be, for example, a picture that was originally captured with a color digital imaging device and stored in a digital input color space such as monitor RGB. A computer 16 stores the digital image and drives the color monitor 12. The computer 16 receives control signals from a user interface that includes such conventional user interface apparatus as a keyboard 18, and a track ball or mouse 20. The computer 16 contains a conventional color graphics program that allows the user to make color balance and tone scale adjustments to the image 14 via means such as a virtual control panel 22 displayed on the monitor and manipulated by the operator via the user interface apparatus.

The color image reproduction system 10 also includes a color hard copy printer 24 that is connected to the computer 16 and produces a color print 26 of the image 14 displayed on the monitor 12 in response to the digital image sent from the computer 16. The digital image sent from the computer is in an output color space such as CMY(K) (cyan, magenta, yellow, (black)) for the printer. The computer 16 and operator interface 18–20 could comprise a conventional desk top computer and its operating system with a standard color-image management software package. The computer 16 also includes a storage medium for storing the color-adjusted images and image transform that can be retrieved for later use. The images and transform may also be stored on portable media such as floppy disk, read by a disk drive 28 in the computer 16.

The preferred embodiment of the present invention involves transforming color digital images displayed on the RGB monitor 12 into digital images for printing on the CMY(K) color printer in such a manner that the printed images appear to have been originally captured on a photographic medium.

FIG. 2 illustrates a generalized process for implementing the digital color image transformation according to the present invention. First the RGB digital color image is adjusted (27) by the operator using the standard color graphics tools in the color image reproduction system 10 to produce an adjusted digital image RGB'. The adjusted digital image is then transformed by a 3D lookup table 29 into printer control signals CMY(K) that will result in the reproduced image having the appearance of originating from a photograph.

The generation of the 3D lookup table 29 according to the present invention will now be described with reference to FIG. 3. The generation of the color image transformation according to the present invention is accomplished in a six five step process. First, a transform from the RGB' to video scene exposure is developed and embodied in 3 1D look-up tables (30). Next a transform from video exposures to photographic exposures is developed and embodied in a 3D look-up table (32). Then a transform from photographic exposures to channel-independent densities are developed and embodied in 3 1D look-up tables (34). Next a transform from channel-independent densities to reproduced densities is developed and embodied in a three dimensional look-up table (35). Next, a transform from reproduced densities to output device control signals CMY is developed and embodied in 3 1D look-up tables (36). And finally, the transform generated in the previous steps are composed into the single 3D look-up table 32 (step 38 in FIG. 3).

The preferred implementation of the steps in the process will now be described in further detail. The first step (30) in the process generates three 1D look-up tables that relates a color video image signal value to corresponding scene exposures based on a typical video camera optoelectronic transfer characteristic. In this preferred implementation these look-up tables are based on a typical video camera characteristic rather than on a monitor characteristic since the industry does not define a typical monitor characteristic. The monitor characteristic will vary as its brightness and contrast control settings are adjusted according to the viewing conditions. Thus, basing these look-up tables on a typical camera characteristic is a useful and practical approach.

In the preferred embodiment of the present invention, the optoelectronic transfer characteristic published in the CCIR 709 recommendation was inverted to generate the video signal value to scene exposure transform. FIG. 4 is a graph showing the CCIR 709 video camera optoelectronic characteristic relating video scene exposure to signal level, which is identical for the R,G, & B channels. The CCIR 709 video camera optoelectronic characteristic is defined by a set of equations listed in the recommendation. These equations may be mathematically inverted to generate a set of equations that define the conversion from video signal values to scene exposures. The characteristic equations are as follows:

$0 \leq E \leq 0.018 : V = 4.5E;$ $E > 0.018 : V = 1.099 E^{0.45} - 0.099,$ where E is the scene exposure and V is the signal level. These equations can be inverted to yield:

TABLE I

| Video Exposure | | | Photoaraphic Exposure | | |
| --- | --- | --- | --- | --- | --- |
| $RV_1$ | $GV_1$ | $BV_1$ | $RP_1$ | $GP_1$ | $BP_1$ |
| $RV_2$ | $GV_2$ | $BV_2$ | $RP_2$ | $GP_2$ | $BP_2$ |
| . | . | . | . | . | . |
| . | . | . | . | . | . |
| $RV_n$ | $GV_n$ | $BV_n$ | $RP_n$ | $GP_n$ | $BP_n$ |

Figure 5:
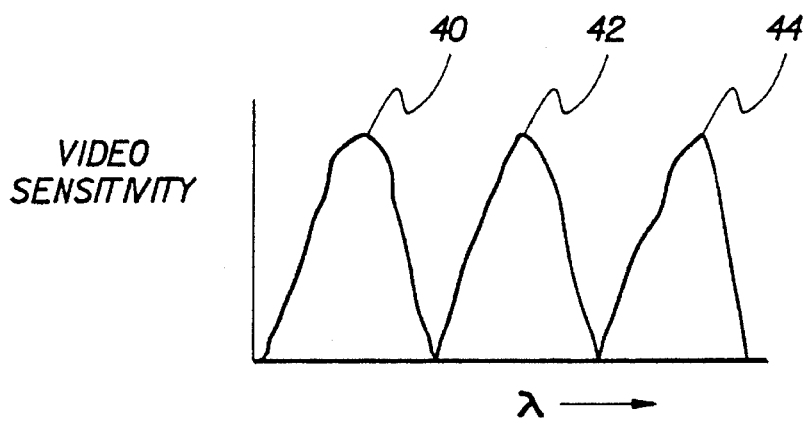
FIG. 5 is a graph showing sensitivity response curves corresponding to the CCIR 709 reference primaries.

The next step (32) in the process is to generate a transform from the video scene exposures discussed in the previous step to photographic exposures. This is accomplished by obtaining the sensitivity response curves for a video camera. FIG. 5 shows a set of these curves for blue, green and red, labeled 40, 42, and 44 respectively, plotting wavelength versus relative sensitivity. These curves are derived from the CCIR 709 reference primaries.

Figure 6:
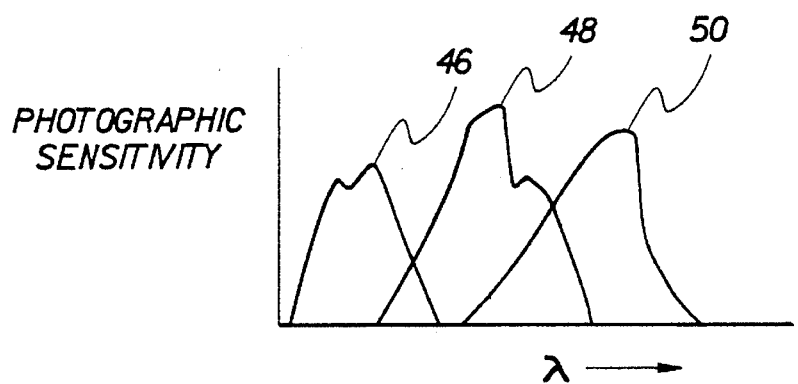
FIG. 6 is a graph showing typical photographic spectral sensitivity curves.
Figures 7, 8, 9:
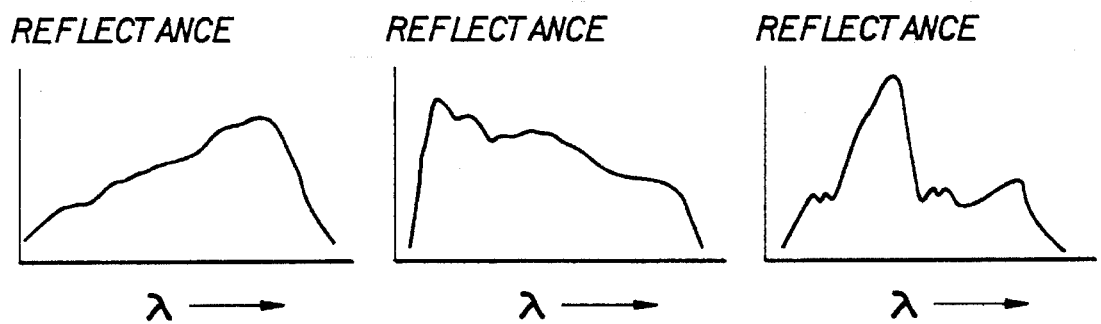
FIG. 7, 8, and 9 are graphs showing spectral reflectances for a series of colors.

Next the sensitivity response curves of the photographic process being simulated are obtained. These curves are published by photographic manufacturers for the particular photographic media (e.g. photographic print or slides) that is being simulated. FIG. 6 shows a typical set of these response curves for blue, green and red, labeled 46, 48 and 50, respectively. Next a set of test color spectral reflectances are obtained for a set of n colored surfaces representing a sample of colors encountered in photographic situations, e.g.. 100 different colored surfaces. The spectral reflectances may be obtained by spectrophotometric methods known to those skilled in the art. For example, see *Measuring Color* by R. W. G. Hunt, John Wiley and Sons, 1987, pages 118–121. FIGS. 7, 8 and 9 illustrate the measured reflectance vs. wavelength for 3 different colored surfaces.

Next, exposures for the spectral reflectances and a typical illuminant (e.g. CIE D65) are computed for the video sensitivities and the photographic sensitivities to generate two lists of exposures as illustrated in Table I. Exposure calculations are well known to those skilled in the art and are of the form:

$$E_k = \frac{\int S_k(\lambda) R(\lambda) P(\lambda) d\lambda}{\int S_k(\lambda) P(\lambda) d\lambda},$$

where, $S_k(\lambda)$=r, g or b spectral sensitivity;
$R(\lambda)$=spectral reflectance;
$P(\lambda)$=illuminant spectral power;
$E_k$=r, g, or b exposures; and
the integral is taken over the visible wavelength range.

TABLE I

| Video Exposure | | | Photoaraphic Exposure | | |
| --- | --- | --- | --- | --- | --- |
| $RV_1$ | $GV_1$ | $BV_1$ | $RP_1$ | $GP_1$ | $BP_1$ |
| $RV_2$ | $GV_2$ | $BV_2$ | $RP_2$ | $GP_2$ | $BP_2$ |
| . | . | . | . | . | . |
| . | . | . | . | . | . |
| $RV_n$ | $GV_n$ | $BV_n$ | $RP_n$ | $GP_n$ | $BP_n$ |

Using well-known regression analysis techniques, a transformation is computed that transforms the video exposures into photographic exposures. The resulting transform is embodied in a 3D look-up table.

Figure 10:
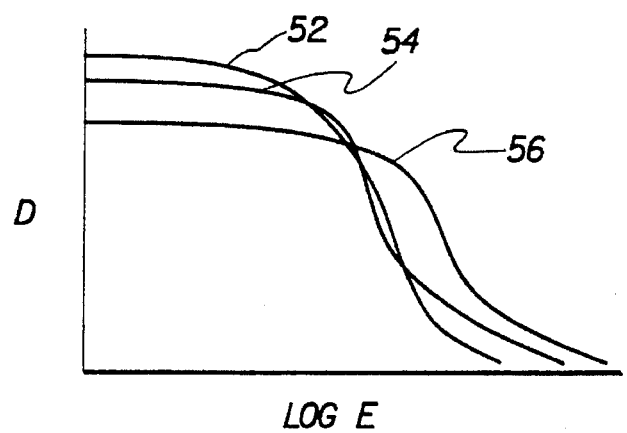
FIG. 10 is a graph showing print-through curves for a typical photographic print.

The next step (34) in the process is to create 3 1D look-up tables that map log photographic scene exposures to channel-independent densities. For photographic prints, the curves that relate log scene exposure to density are known as print-through curves and are constructed from the negative film DlogE curves and the photographic paper DLogE curves by a process well described in the art. The photographic film and paper DlogE curves are available from the manufacturer of the film and paper. FIG. 10 illustrates typical print-through curves for red, green and blue labeled 52, 54, 56 respectively for a typical photographic film and paper combination.

Figure 11:
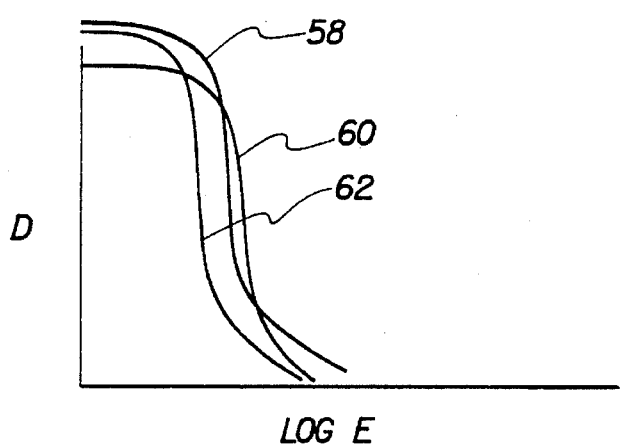
FIG. 11 is a graph showing density versus log Exposure curves for a typical photographic transparency film.

For transparency films the DlogE curves are published by the manufacturers. FIG. 11 shows a set of DlogE curves for a typical transparency film, with the red, green and blue responses labeled 58, 60 and 62 respectively.

The next step (35) in the process is to create a 3D look-up table or matrix transformation that transforms the non-neutral densities from the previous step to the reproduced densities desired in the final hardcopy image, thereby accounting for the interlayer chemical interactions in typical photographic films and the differences in the imaging dyes between the photographic film and the selected color hardcopy media 26.

One method for creating the transform referenced in step (35) is to first approximate the interlayer chemical interactions of a selected photographic film. The collection of colored materials described above may be photographed under typical illumination (e.g. daylight). The film is chemically processed, and the r,g,b densities for each reproduced color sample are measured using an instrument such as a densitometer. The exposures corresponding to each colored sample, previously computed in step (32), are mapped into channel-independent densities using the look-up table transform from step (34). A first 3-D look-up table or matrix transformation is created relating the measured photographic film reproduced densities to the calculated channel-independent densities.

Next, the differences in the imaging dyes between the photographic film and the selected color hardcopy media are accounted for. A colorimeter is used to measure the colorimetry of the photographic film image of the colored materials in terms of CIE 1931 XYZ tristimulus values or other colorimetric quantities known in the art. A second 3-D look-up table or matrix transformation is created relating the colorimetric values for the photographic film image of each of the colored materials to their corresponding measured r,g,b density values. A series of colored patches is created on the color hardcopy media 26 using the color hardcopy printer 24. These may be made by preparing a table of printer control signal values for producing hardcopy color patches that sufficiently sample and cover the color gamut of the hardcopy printer and media. The hardcopy color patches are measured for reproduced density and for colorimetric values as described above. A third 3-D look-up table or matrix transformation is created relating the color hardcopy r,g,b density values to their corresponding colorimetric values.

Finally, the 3-D look-up table referenced in step (35) is composed from: a) the transformation from color hardcopy reproduced densities to colorimetry; b) the transformation from colorimetry to photographic film reproduced densities; and c) the transformation from photographic film reproduced densities to channel-independent densities. This composed transform relates channel-independent densities to reproduced densities for the color hardcopy media.

The next step (36) in the process is to generate the transform from reproduced densities to output device control signals and to embody these transforms in three 1D look-up tables. This process is simply any of the well known printer calibration procedures. One such procedure for example is to first prepare a table of printer control signal values that will produce a density series of near neutral density color patches. A table of exemplary control values is shown in Table II below.

TABLE II

|        | Red | Green | Blue |
|--------|-----|-------|------|
| Step 1 | 0   | 0     | 0    |
| Step 2 | 10  | 10    | 10   |
| .      | .   | .     | .    |
| .      | .   | .     | .    |
| Step N | 255 | 255   | 255  |

Figure 12:
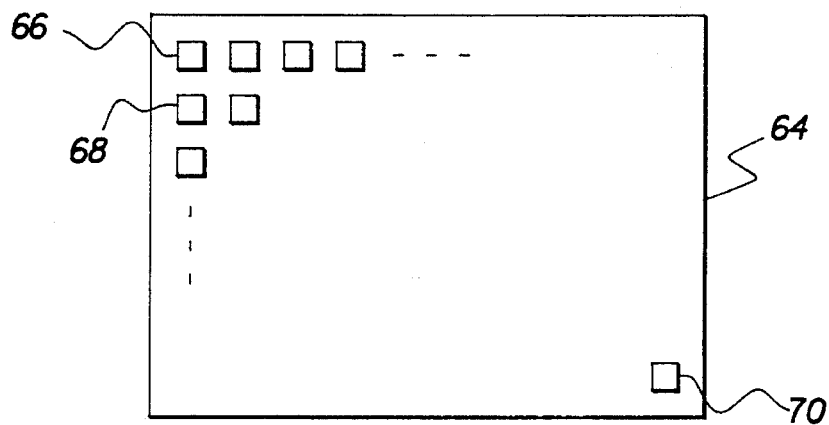
FIG. 12 is a schematic diagram illustrating a color patch output employed in generating the LUTs relating densities to output hard copy device control signals.

The table is then sent to the printer 24 to produce the hard copy image 64 shown in FIG. 12, where patch 66 corresponds to Step 1, patch 68 corresponds to Step 2 and so on to patch 70 that corresponds to step N. Using a status A densitometer, the RGB densities of each reproduced color patch are measured to generate three 1D lookup tables relating reproduced density to control signal values.

The final step (38) is to compose the sequence of 1D and 3D lookup tables generated in the previous steps 30, 32, 34, and 36 respectively, using any of the known procedures for composing lookup tables to form a single 3D lookup table that represents the sequential application of the transforms to a digital image. The presently preferred composition technique is the one described in U.S. Pat. No. 5,209,911 issued May 4, 1993 to Newsman et. al. According to this method of composition, each of the transforms is implemented successively on a set of input reference values to generate a set of output reference values. The input and output reference values are used to determine the composite transform definition using linear interpolation.

Figure 13:
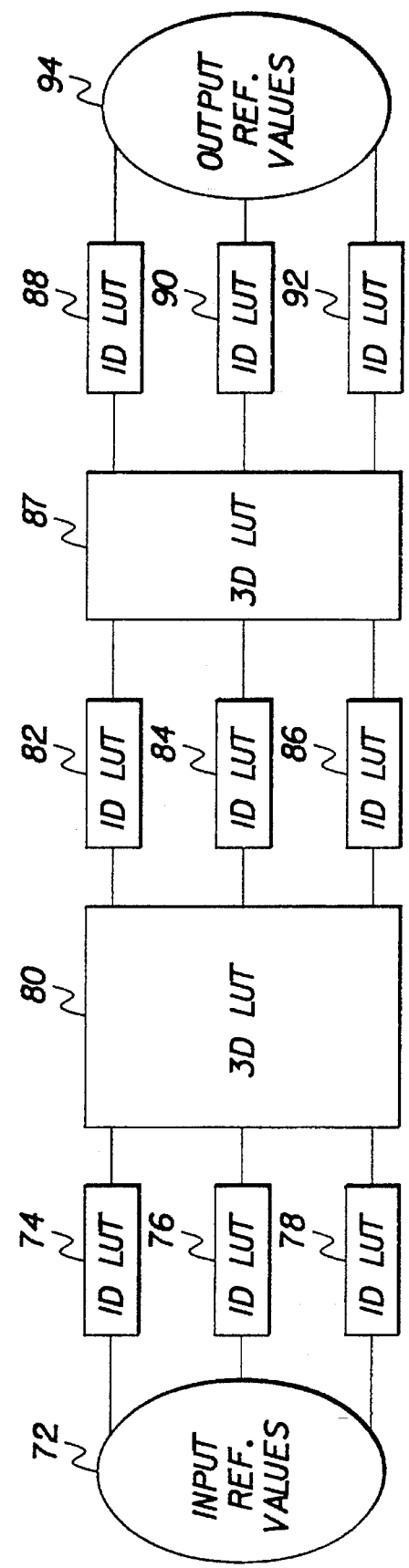
FIG. 13 is a schematic diagram illustrating a color image reproduction method according to the present invention.

FIG. 13 illustrates the process of applying the reference values 72 to the three 1D lookup tables 74, 76, and 78 generated in step 30 and representing the transformation from RGB' to video scene exposures. The outputs of the three 1D lookup tables are applied to the 3D lookup table 80 generated in step 32 that transforms video exposures to photographic exposures. The outputs of the 3D lookup table 80 are applied to the three 1D lookup tables 82, 84, and 86 generated in step 34 that transform the photographic exposures to reproduced densities. The outputs from the three 1D lookup tables 82, 84, and 86 are applied to the 3D lookup table 87 generated in step 35 that transforms the channel-independent densities to reproduced densities. Finally, the outputs of the 3D lookup table 87 are applied to the three 1D lookup tables 88, 90, and 92 that transform the reproduced densities to output printer control signals. The outputs from the tables 88, 90 and 92 are the output reference values 94 used with the input reference values 72 to determine the single 3D lookup table (not shown) generated in step 38.

While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

PARTS LIST 10 color image reproduction system
12 color image display
14 color image 16 computer
18 keyboard
20 track ball
22 virtual control panel
24 printer
26 color print
27 color and tone scale adjustment
28 disk drive
29 transform
(30) Generate transform from RGB' to video scene exposure step
(32) Generate transform from video exposure to photographic exposure step
(34) Generate transform from photographic exposure to channel-independent density step
(35) Generate transform from channel-independent densities to reproduced densities step
(36) Generate transform from reproduced density to control signal step
(38) Compose transform step
40,42,44 video camera sensitivity response curves
46,48,50 photographic medium sensitivity response curves
52,54,56 print-through curves
58,60,62 transparency film DlogE curves
64 test image
66,68,70 test patches
72 input reference values
74,76,78 1D lookup tables
80 3D lookup table
82,84,86 1D lookup tables
88,90,92 1D lookup tables
94 output reference values

We claim:

1. A color image reproduction system, comprising:
   a) color monitor for displaying a color digital image having the color and tone reproduction characteristics of an image captured by a color digital imaging device;
   b) color hard copy output printer; and
   c) transform means for transforming said color digital image to color hard copy output printer control signals for producing a color hard copy having the color and tone reproduction characteristics of a photograph, the transform means including:
      i) transform means for transforming the color digital image to video scene exposures;
      ii) transform means for transforming the video scene exposures to photographic scene exposures;
      iii) transform means for transforming photographic scene exposures to channel-independent densities;
      iv) transform means for transforming channel-independent densities to reproduced photographic densities; and
      v) transform means for transforming the reproduced photographic densities to control signals for driving the color hard copy output printer.

2. The color reproduction system claimed in claim 1, wherein said transform means comprises a three dimensional lookup table embodying a composed sequence of said transform means i)–v).

3. The color image reproduction system claimed in claim 1, wherein said color hard copy output printer produces a color transparency.

4. The color image reproduction system claimed in claim 1, wherein said color hard copy output printer produces a reflection print.

5. The color image reproduction system claimed in claim 1, further comprising means for adjusting the color and tone characteristics of the color digital image prior to transformation.

6. A method of reproducing a color digital image RGB having the color and tone reproduction characteristics of an image captured by a color digital imaging device, displayed on a color monitor, on a color hard copy output printer, comprising the steps of:
   a) adjusting the color balance and tone scale of the digital image RGB to produce an adjusted color digital image RGB'; and
   b) transforming the adjusted color digital image RGB' to color hard copy output printer control signals that will produce a color hard copy having the color and tone characteristics of a photograph by:
      i) generating a transform for transforming the color digital image to video scene exposures;
      ii) generating a transform for transforming the video scene exposures to photographic scene exposures;
      iii) generating a transform for transforming photographic scene exposures to channel-independent densities;
      iv) generating a transform for transforming channel-independent densities to reproduced photographic densities;
      v) generating a transform for transforming the reproduced densities to control signals for driving the color hard copy output printer
      vi) composing the transforms generated in the previous steps to produce a composed transform; and
      vii) applying the composed transform to the adjusted digital image RGB'.

7. A computer program product for reproducing a color digital image RGB having the color and tone reproduction characteristics of an image captured by a color digital imaging device, displayed on a color monitor, on a color hard copy output printer, comprising a computer readable storage medium having a computer program stored thereon for performing the steps of:
   a) adjusting the color balance and tone scale of the digital image RGB to produce an adjusted color digital image RGB'; and
   b) transforming the adjusted color digital image RGB' to color hard copy output printer control signals that will produce a color hard copy having the color and tone characteristics of a photograph by:
      i) generating a transform for transforming the color digital image to video scene exposures;
      ii) generating a transform for transforming the video scene exposures to photographic scene exposures;
      iii) generating a transform for transforming photographic scene exposures to channel-independent densities;
      iv) generating a transform for transforming channel-independent densities to reproduced photographic densities;
      v) generating a transform for transforming the reproduced densities to control signals for driving the color hard copy output printer
      vi) composing the transforms generated in the previous steps to produce a composed transform; and
      vii) applying the composed transform to the adjusted digital image RGB'.

* * * * *